UNITED STATES PATENT OFFICE 2,239,718

COMPOSITION OF MATTER AND PELLICLES OF POLYVINYL ALCOHOL

Emmette F. Izard, Kenmore, N. Y., assignor to E. I. du Pont de Nemours & Company, Wilmington, Del., a corporation of Delaware No Drawing. Application May 27, 1937, Serial No. 145,116

25 Claims. (Cl. 260—42)

This invention relates to new compositions of matter comprising polymerized vinyl resins and especially polyvinyl alcohol modified with materials compatible therewith, and to articles made therefrom, such as sheets, films, threads and the like. More particularly, it relates to thin, self-sustaining pellicles of polyvinyl alcohol suitable for use as wrapping materials. Still more particularly, it relates to such pellicles containing a moistureproofing agent such as a wax or wax-like material, and which are clear, transparent, flexible, non-tacky, and preferably moistureproof.

In recent years there have been put upon the market in large quantities synthetic sheets, films, threads, and other articles made from various types of materials, such as certain resins, regenerated cellulose, cellulose derivatives and others. One of the most recently developed of these materials has been polyvinyl alcohol, which is characterized by several unique properties. It is extremely tough, flexible and transparent, and has very high elongation. However, it has several disadvantages, notably its low resistance to water, typified by the fact that it is completely soluble in hot water. In order to overcome this and other disadvantages, it has been suggested to add various modifying ingredients to the polyvinyl alcohol composition. Most of the ingredients hitherto added, however, do not form homogeneous mixtures capable of being cast into transparent clear articles and/or do not secure the proper modifying effect that is desired, such as increased resistance to water, or to the passage of water vapor therethrough.

In the manufacture of sheets and films comprising polyvinyl alcohol, it is often desired to increase the resistance to the passage of water vapor therethrough, as pointed out briefly above. As is well known, certain materials have the characteristic of contributing moistureproofness to film when incorporated therein in the proper quantity and manner. Among these materials are waxes and wax-like materials, such as paraffin. Unfortunately, however, waxes and wax-like materials are for the most part incompatible with film-forming materials, including polyvinyl alcohol.

An object of the present invention is therefore to furnish polymerized vinyl resins and particularly polyvinyl alcohol compositions modified with compatible materials. Another object of the present invention is to produce polyvinyl alcohol threads, films and like articles from compositions comprising a polyvinyl alcohol and a compatible material. Another object of the invention is to furnish modified polyvinyl alcohol threads or films having greater water resistance than unmodified polyvinyl alcohol threads, films and like articles. A further object is to form polyvinyl alcohol sheets and films containing moistureproofing agents, such as waxes or wax-like materials. A still further object of the invention is to provide modified polyvinyl alcohol threads, films and other articles that have an improved affinity for certain dyes, such as acid dyestuffs. Still another object is to provide transparent polyvinyl alcohol sheets and films which have an increased resistance to the passage of water vapor therethrough. Other objects will appear from the description that follows.

These objects are accomplished in general by forming a composition comprising a polymerized vinyl resin, particularly polyvinyl alcohol, and an amino polymer, said polymer being soluble in dilute aqueous acid solutions and very compatible with polyvinyl alcohol, both in solution and in the form of a dried film, thread or other shaped article. In the preferred form of the invention, applicable to sheets, films or pellicles suitable for wrapping tissue, the compositions are further modified by the addition of a moistureproofing agent, such as a wax or wax-like material, with or without other blending agents, plasticizers, etc.

These compositions so modified may be converted into films by a process consisting of casting the aqueous compositions upon smooth surfaces, such as glass plates or metal casting wheels, evaporating the water therefrom, and stripping the dried self-sustaining film from the casting surface. Similarly, they may be converted into fibers by spinning from an appropriate spinneret into a heated chamber. Alternatively, certain of these compositions can be converted into fibers or films by extrusion into appropriate coagulating baths, such as those disclosed in copending application to Izard and Kohn, Serial No. 145,118, filed of even date herewith.

The amino polymers which are contemplated as coming within the scope of this invention are all substantially insoluble in water and in 5% aqueous ammonia, but soluble in 2% aqueous acetic acid. The amino nitrogen may be primary, secondary or tertiary, part of an open chain or of a cyclic molecular structure.

The amino polymers which may be used in polyvinyl alcohol compositions, as illustrated in the examples, may be subdivided into several groups as follows:

1. The first group, closely related to though nevertheless distinct from cellulose, may be considered as hexose amine polymers, or more broadly as carbohydrate amine polymers, which have, where necessary, been purified and converted into the acid soluble type. With or without such treatments, the highly polymeric molecule is built up by nature, and the amine nitrogen, as a rule is present in the natural product. Those in which the nitrogen is present in the substance as it exists naturally may be of animal, such as marine or insect origin on the one hand, or vegetable origin on the other. Deacetylated chitin, which is by far the best example of a hexose amine polymer is, for example, of marine origin. Its preparation is fully discussed in Rigby U. S. Patent No. 2,040,879, issued May 19, 1936. It may be partially or completely deacetylated, depending on the conditions present during the deacetylation. The more complete the deacetylation, the more soluble is the salt produced by reacting with acid. However, some degradation of the chitin takes place during deacetylation, and the extent of degradation increases as the deacetylation becomes more complete. Therefore, for purposes of expediency, there must be a balance established between the completeness of deacetylation and the degradation of the deacetylated product. For ordinary purposes, it will be sufficient to use a product prepared from chitin which has been 85–90% deacetylated. It will be understood that this range of deacetylation is not limitative since chitin which has been deacetylated to an extent as low as 50% or lower, or as high as 100%, may be used with advantage.

Also of animal origin is deacetylated chondroitin obtainable in a manner similar to the preparation of deacetylated chitin. The polymers obtained from fungi such as aspergillus niger, on the other hand, are of vegetable origin. Examples of carbohydrate amine polymers in which the highly polymeric molecule has been built up by nature, but into which the amine nitrogen has been introduced synthetically are the alkylamino celluloses. The preparation of aminocellulose soluble in dilute acetic acid is described in copending application to Hardy, Serial No. 61,842, filed January 31, 1936. The preparation of alkylamino celluloses soluble in at least a stoichiometrical amount of 5% aqueous acetic acid is described in copending application to Haskins, Serial No. 61,806, filed January 31, 1936. Regardless of the source of the nitrogen, this first group also includes various reaction products and chemical derivatives of carbohydrate amine polymers, provided of course that they have the required solubility characteristics.

2. The second group of amino polymers comprises that group of synthetic resins, in the making of which ammonia in some instances and monomeric amino nitrogen containing bodies in others have been employed. This group is distinct in that the highly polymeric molecules are built up wholly by artificial means, i. e. they are not synthesized by nature. The resins of this group may be considered broadly as those which contain amino nitrogen and have the requisite solubility characteristics. The following types of resins are illustrative of the classes among which highly polymeric amino nitrogen containing bodies falling in this classification may be found:

(a) Resinous polymeric amino alcohol esters of acrylic acid and of its homologues substituted in the alpha position by a hydrocarbon radical, (b) resinous reaction products of phenols, aldehydes and ammonia or primary or secondary amines, and (c) resins prepared by reacting bodies containing ketone groups with ammonia or certain amines.

(a) Examples of the first of the above subclasses of resins are beta-diethylaminoethyl alpha - methacrylate, beta - piperidyl - N - ethyl alpha-methacrylate, beta-morpholine - N - ethyl methacrylate, beta-di-N-butylaminoethyl methacrylate, beta-dimethylaminomethyl methacrylate, triethanolamine methacrylate, dimethylaminoethyl methacrylate, and beta-dicyclohexylaminoethyl alpha-methacrylate. These resins may be prepared by spontaneous polymerization of the monomeric compounds, but for the purposes of the present invention, advantage can be taken of a unique property of the monomers, namely their ability to form polymerizable salts with aqueous acids. The monomer as prepared may simply be dissolved in the stoichiometrical amount or more of aqueous acid and the solution heated with a polymerization catalyst such as benzoyl peroxide until polymerization of the salt is effected. The preparation of polymeric amino alcohol esters of alpha substituted acrylic acids is described in U. S. Patent 2,138,763 issued November 29, 1938. The preparation of polymeric salts of amino alcoholic esters of alpha substituted acrylic acids is described in U. S. Patent 2,138,762 issued November 29, 1938.

(b) An example of the second of the above subclasses of resins having amino nitrogen and the specified solubilities is the reaction product of meta-cresol, formaldehyde and dimethylamine. Other similar products are the reaction product between phenol, formaldehyde, ammonia and dimethylamine; between phenol, lignin, formaldehyde and dimethylamine; between phenol, formaldehyde and dimethylaminomethanol; between phenol, formaldehyde and dimethylol cyclohexanolamine; and between phenol, formaldehyde, ammonia and aniline. Other phenols such as p-tertiary amyl phenol may be substituted for phenol and cresol, and other primary or secondary amines for the ones disclosed. It is desirable in most cases, possible in all cases, and necessary in some cases, to react the amine or ammonia with a part of the formaldehyde before adding the remainder. These resins are to be sharply distinguished from the phenol-aldehyde resins prepared in the presence of only catalytic amounts of ammonia or amines, which resins cannot be employed in accordance with the methods of this invention because they lack the preponderance of amino nitrogen which induces the proper solubility characteristics. The molal ratio of amine to phenol which is used in making the resins with which the present invention is concerned is on the order of 1:2. The preparation of these resins is described in U. S. Patents Nos. 2,031,557, 2,033,092 and 2,098,869.

(c) In the third of the above subclasses of resins having amino nitrogen and the specified solubilities can be included reaction products of polymeric methyl vinyl ketones with ammonia or a primary amine, as described in U. S. Patent 2,122,707 issued July 5, 1938. Examples of amines suitable in this connection are cyclohexylamine, glucamine, ethanolamine and ethylene diamine. Also to be included are resins obtained by hydrogenating ketone resins in the presence of ammonia or a primary or secondary amine.

as disclosed in U. S. Patent 2,063,158 issued December 8, 1936.

3. The third group of amino nitrogen containing polymers included in this invention consists of protein derivatives containing sufficient amino nitrogen to make them comply with the aforementioned solubility requirements. Examples are piperidylmethyl zein, dimethylaminomethyl zein, diethylaminomethyl zein, dibutylaminomethyl zein, piperidyl methyl glycinin, dimethylaminomethyl gliadin, and dimethylaminomethyl casein. These products may be made in one way as follows. The zein is first suspended in water or dissolved in about 75% alcohol, preferably the latter. To the alcohol solution is added aqueous formaldehyde, a secondary amine and sufficient alcohol to keep the concentration at about the original figure. The mixture is allowed to stand or may be heated gently until it becomes soluble in acetic acid, 6–18 hours, depending on the temperature usually being required. The final product, in order to be acid soluble, should have at least 8–10% basic amino nitrogen. The maximum obtainable is around 22% and the products having the high percentages are the most desirable for use in the present invention. The preparation of the amino proteins is described in copending application to Meigs, Serial No. 59,643, filed January 17, 1935.

Instead of simple polymers, interpolymers may be prepared, for instance by reacting methyl methacrylate and methyl vinyl ketone in the presence of ammonium hydroxide or reacting beta-cyclohexylaminoethyl methacrylate monomer and beta-di-methylaminoethyl methacrylate monomer together under suitable conditions, or reacting dicyclohexylaminoethyl methacrylate with methyl vinyl ketone under suitable conditions. Other equivalent polymeric materials such as copolymers may also be used, provided their solubility characteristics are as previously set forth.

It has been stated that chitin is believed to be an acetylated carbohydrate amine polymer. This is in accordance with the evidence presented in the literature. It is also believed to be an acetylated mixed or cross or interpolymer of two carbohydrate amines. The invention is not, however, to be limited to theory, but is to cover the use of the deacetylated chitin regardless of its ultimate molecular composition.

The term "deacetylated chitin," as used in the claims, is intended to include the product which is prepared by removing the acetyl groups from chitin in any suitable way. Unless otherwise qualified, the term also includes the product prepared by solubilizing the deacetylated chitin, as for example, by forming a salt with an acid, and by again insolubilizing. It is also intended to include any other product substantially identical therewith, as for example, where such product is produced synthetically.

The amino polymers useful in the practice of this invention are very insoluble in water, but may be made soluble therein by causing them to react with any one of a large number of acids including acetic, formic, citric, glycolic, malic, maleic, succinic, adipic, phthalic, tartaric, benzoic and hydrochloric acids, and the like. These water soluble salts, upon being dried, preferably at an elevated temperature, are more or less rapidly rendered insoluble in water. In the case of salts formed by reacting with volatile acids, particularly volatile acids which are only slightly ionized, like acetic acid, the conversion to insolubility is easily and quickly accomplished since the acid, being weak or slightly ionized, is readily dissociated from its salt and, being volatile, is easily removed by heat, leaving an insoluble residue. Salts formed from the non-volatile acids and/or from the highly ionized acids are much less readily converted to insolubility, and consequently in the practice of this invention, it is preferred to use salts of the deacetylated chitin and of volatile acids of low ionization, of which acetic acid is an example. However, in the case of the salts formed from the non-volatile and/or highly ionized acids, these salts may be converted into the insoluble form by treatment with ammonia, as, for example, in the form of gaseous ammonia.

The solubility of the above types of polymers depends to a great extent on the size of the monomeric molecule, and particularly upon the length of the hydrocarbon chain. For example, beta-dicyclohexylaminoethyl alpha-methacrylate is less soluble in aqueous acid than dimethylaminoethyl methacrylate. On the other hand, the longer-chain compounds are more soluble in organic hydrocarbon compounds, such as toluene. The use of some of the interpolymers mentioned above enables a proper balance to be maintained between solubility in aqueous acetic acid and solubility in toluene, which is useful for some purposes, as hereinafter described.

Any suitable concentration of amino polymer may be employed in the aqueous solution of its salt, depending upon the method of operation used and the relative proportions of polyvinyl alcohol and amino polymer desired in the final composition. If a transparent, clear article is desired, the amino polymer is used in quantities which do not exceed the compatibility limit with polyvinyl alcohol. This compatibility limit will naturally vary with the particular polymer selected, but generally speaking the amino polymer may be used in widely varying proportions. Thus, some of the above examples—deacetylated chitin, diethylaminoethyl methacrylate, and dimethylaminomethyl zein—are employed in amounts one half of and equivalent to the amount of polyvinyl alcohol present. In a few cases such as cresol-amine-formaldehyde resins, the polymer may only be used in relatively small amounts if a transparent, clear article is to be secured. On the other hand, if the polyvinyl alcohol composition is to be applied to a use wherein complete transparency is not a requisite, the amino polymer may be incorporated in amounts even exceeding the polyvinyl alcohol present, depending upon the particular requirements of the application.

Any desired type of polyvinyl alcohol of any convenient viscosity such as 15–75 centipoises (preferably 18–40 centipoises in 4% solution at 20° C.) may be employed in the practice of this invention. Polyvinyl alcohol is generally produced by hydrolysis of polyvinyl acetate. The term "polyvinyl alcohol" is generally understood to include those products in which some of the alcohol groups are esterified or otherwise reacted, as long as sufficient hydroxyl groups remain so that the material is soluble in hot water. Such varieties of polyvinyl alcohol may result either from failure to complete the hydrolysis of the polyvinyl acetate or other materials from which it is formed, or by further partial reaction of the polyvinyl alcohol with other materials, such as formaldehyde. Substituted polyvinyl alcohols, such as polymethylvinyl alcohol, may also be used.

Other modifying ingredients can, if desired, be added to the compositions of the present invention such as other resinous materials, pigments (e. g. titanium dioxide), dyes, urea, softeners for polyvinyl alcohol (e. g. ethylene glycol, glycerol, sugars and the like), light sensitive (e. g. luminescent or phosphorescent) materials, etc.

In the preferred form of the invention the polyvinyl alcohol-amino polymer composition is further modified by the addition of a moistureproofing agent such as a wax or wax-like material. In this species the amino polymer selected must either be compatible with the moistureproofing agent employed or with an additional blending agent serving to blend the amino polymer and the wax. With either of these ends in view the amino polymer must be soluble in toluene at least to the extent of 10%. In order to be present in sufficient amount in the aqueous polyvinyl alcohol composition, it is also preferably soluble in 5% aqueous acetic acid at least to the extent of 10%. Amino polymers which have these characteristics are the interpolymer of dicyclohexylaminoethyl methacrylate and dimethylaminoethyl methacrylate, the interpolymer of dicyclohexylaminoethyl methacrylate and diethylaminoethyl methacrylate, and dicyclohexylaminoethyl methacrylate alone.

In incorporating a moistureproofing agent in the compositions of the present invention, the preferred method is to disperse the moistureproofing agent, with or without other blending agents, such as rosin, rosinates, or the modified rosin described and claimed in U. S. Patent to Morton, No. 2,017,866, in an aqueous acidic solution of such an amino polymer, and then to add to this dispersion an aqueous solution of polyvinyl alcohol. These compositions can be cast to form moistureproof sheets and films, as hereinafter described. There are also preferably included in such compositions suitable plasticizers. In the case of water or aqueous acid insoluble plasticizers, such as dibutyl phthalate, tricresyl phosphate and the like, they are preferably dispersed with the wax in the aqueous solution of the amino polymer. In the case of acid soluble plasticizers, they may be added at any suitable stage of forming the mixture. Examples of the latter type of plasticizers are higher aliphatic amines such as dicyclohexylaminoethanol, dicyclohexylamine, dodecylamine, octadecylamine, and the like. These substances are, in general, of low volatility and soluble in dilute acetic acid, and furthermore have the faculty of facilitating the stripping of the cast film from the casting support.

As the moistureproofing agent, it has been found preferable to use a wax or wax-like substance and particularly one of rather high melting point. Paraffin waxes of higher or lower melting point may be used, depending upon the degree of moistureproofness and/or the surface characteristics desired. Other waxes such as Montan wax, Carnauba wax and ozocerite may also be employed. Thus, a mixture of Montan wax and paraffin wax will aid in securing good surface characteristics. Other materials, such as those described and claimed in U. S. Patents 2,098,534 to 2,098,542 inclusive, may be used. These moistureproofing agents, of course, are not soluble in water and must be dispersed in the composition. In doing this, in order to secure good moistureproofness and transparency, care must be taken to see that the size of the wax particles is kept small. It has been found, for example, that the average size of the wax particles should be below 4 microns in diameter and preferably between 0.5 and 2 microns in diameter, or even less in size. This particle size may be achieved in any desired fashion, such as by grinding the film-forming dispersion in a colloid mill.

In the manufacture of sheeting containing a moistureproofing agent, in order to secure a film with improved resistance to the passage of water vapor therethrough, the following proportions of ingredients are preferred, based on the weight of the dry film:

| | Per cent |
|---|---|
| Polyvinyl alcohol | 70 –90 |
| Amino polymer | 10 –25 |
| Plasticizer | 4.5–12 |
| Moistureproofing agent | 3 – 4.5 |

When employing additional blending agents, such as rosin, modified rosin, or rosinates, and particularly those which are fairly compatible per se with polyvinyl alcohol, much smaller quantities of the acid soluble resin can be employed, being substituted by an equivalent quantity of the additional blending agent. In this case the amino polymer serves as a dispersing agent for the wax and blending agent, said amino polymer comprising approximately 3–25% and preferably 8–15% of the mixture to be dispersed. In all cases the specific proportions will vary with the specific ingredients being used, their compatibility with the various other ingredients, and the degree of resistance to the passage of water vapor therethrough, or moistureproofness, desired. If a high degree of clarity and transparency is desired, the lower limits for the moistureproofing agent will be used, whereas, if moistureproofness is the prime consideration and transparency of only slight moment, the quantity of moistureproofing agent will be correspondingly increased.

Having described the compositions generally, the following specific examples will now be given:

*Example I*

One hundred parts of a 10% aqueous solution of polyvinyl alcohol are mixed with 100 parts of an aqueous 5% solution of deacetylated chitin and acetic acid, prepared as in Example 1 of U. S. Patent No. 2,040,879. The mixed solution is perfectly clear and, when cast upon a glass plate, dries to a clear, transparent film.

*Example II*

Thirty parts of a 10% aqueous solution of polyvinyl alcohol and 30 parts of a 10% solution of diethylaminoethyl methacrylate polymer in 4% aqueous acetic acid are mixed to give a perfectly clear solution that can be cast into clear, transparent articles without any difficulty.

The diethylaminoethyl methacrylate polymer of this example is prepared as follows: One hundred seventeen parts (1 mol) of beta-diethylaminoethanol and 400 parts (4 mols) of methyl methacrylate are dissolved in 300 parts of dry benzene containing 30 parts p-phenylene diamine, and heated in an oil bath under a 48″ fractionating column fitted with a distilling head arranged for controlled reflux and distilled until all the moisture present in the reagent has been removed. Beta-diethylaminoethyl methacrylate is isolated by collecting the fraction boiling at 85±5° C. at 5 mm. pressure, carefully washing eight times with cold water to remove traces of p-phenylene diamine, drying with anhydrous magnesium sulfate, filtering, washing the drying agent with ether, combining the washings with the bulk of the product and then distilling the ether under reduced pressure in an atmosphere of nitrogen. The monomeric ester is left in the distilling glass as an almost colorless liquid which polymerizes spontaneously to a tough, transparent, pale amber polymer. When allowed to stand at room temperature or even at a lower temperature, the polymer was insoluble in water and in the common oxygenated organic solvents, and soluble in acetone.

Example III

Fifteen grams of a 20% solution of polyvinyl alcohol in water and 15 grams of a 10% solution of dimethylaminomethyl zein in 4% aqueous acetic acid are mixed to yield a clear and transparent composition that can be converted into a clear, transparent film by dry or wet casting procedures.

The dimethylaminomethyl zein utilized in this example may be prepared conveniently in the following manner: A suspension of 500 grams of zein in 500 cc. of methyloldimethylamine (prepared from formaldehyde and dimethylamine) and 3.5 liters of water was stirred and allowed to stand at 25°–30° C. for a period of two days. The mixture became very viscous and sticky, and the solid material was separated by centrifugation. The product was dried directly by means of a hot air blast in an oven at 50° C. There was thus obtained 384 grams of dimethylaminomethyl zein which was readily soluble in 1.5% aqueous acetic acid.

Example IV

Two hundred twenty-five grams of a solution containing 7.5 grams of deacetylated chitin and 3.75 grams of acetic acid are added to 45 grams of polyvinyl alcohol and the mixture heated to 95° C. with stirring, until the polyvinyl alcohol is completely in solution. After dilution with 100 grams of water, the solution is filtered. The filtered solution is maintained at 75° C. and extruded through a multiple hole spinneret into a coagulating bath maintained at 40–50° C. and composed of a 35% solution of ammonium sulfate in water. The filaments of modified polyvinyl alcohol are passed through the coagulating bath at a speed of 120 feet per minute, and after a bath travel of approximately 24 inches are completely coagulated and can be wound upon a bobbin in the usual fashion. Upon drying, these filaments appear quite flexible, have fair tensile strength, and can be used directly or, if desired, they can first be rendered water insoluble by treatment with an aqueous bath containing an acidified formaldehyde solution.

Example V

To a solution of 25.5 grams of the interpolymer of dicyclohexylaminoethyl methacrylate (70 parts) with dimethylaminoethyl methacrylate (30 parts) in 38 grams of glacial acetic acid and 182 grams of water, which solution is being circulated in a colloid mill at a temperature of 65–75° C., is added 4.5 grams of melted paraffin wax (melting point 61–63° C.) and the whole is circulated through the hot colloid mill until the dispersed wax has been reduced to a particle size of 2 to 4 microns and preferably of about 2 microns. After this dispersion has cooled to room temperature and the foam has been removed, it is added to a solution of 70 grams of polyvinyl alcohol in 350 grams of water. This mixture is stirred until it is uniform and, after it has stood until the bubbles have disappeared, is ready for casting.

Example VI

An emulsion is prepared by dispersing a solution of 10 parts of the modified rosin mentioned heretofore and 5 parts of paraffin wax (melting point 61–63° C.) in 15 parts of xylol, with the aid of a colloid mill, in a solution of 2 parts of the interpolymer of 70 parts of dicyclohexylaminoethyl methacrylate with 30 parts of dimethylaminoethyl methacrylate in 2 parts of glacial acetic acid and 66 parts of water. The temperature of the mixture and of the colloid mill is 40–60° C. during the dispersion. After dispersion, the particle size of the dispersed phase is 1 to 3 microns, and preferably 1 to 2 microns.

After the bubbles have been removed and the dispersion has cooled to room temperature, 40 parts of the dispersion are added to 150 parts of a 15% solution of polyvinyl alcohol in water containing 1.5 parts of glycerol. This mixture is stirred until uniform and, after the bubbles have disappeared, is ready for casting.

The above described compositions can be formed into film by methods well known to the art. In this connection, the following detailed description is given of a preferred method by which moistureproof film may be formed from the preferred composition containing a moistureproofing agent.

The composition is delivered by means of a metering pump to a casting hopper, which is maintained at a temperature substantially equal to that of the casting composition, for example about 80–95° C. By means of the hopper, a thin layer of the composition is deposited on the highly polished surface of a casting wheel or continuous band or belt as the latter revolves, the layer being smoothed to a uniform thickness by a doctor knife, which latter may, if desired, be one of the edges of the hopper. The wheel or belt surface is maintained at a temperature of about 80–95° C..

As an alternative for the deposition of a uniform layer of casting composition on the surface, the hopper may be provided with a pair of adjustable hopper lips, which together form an extrusion orifice in the shape of an elongated slit. By adjusting the width of the slit, a given, predetermined amount of casting composition will be extruded in a sheet-like form and will be deposited as such on the casting surface, which advances at the same speed as the linear extrusion speed of the film-forming composition.

The hopper is preferably located in a casting chamber in which the atmosphere is quiescent and is maintained at a temperature of about 80–95° C. The advancing surface, together with the deposited layer of film-forming composition, emerges from the casting chamber into a drying chamber. Air passing through the drying chamber at a temperature of about 80–110° C., or higher, facilitates removal of the water from the composition. After a period of 1–10 minutes, depending on the various factors involved, such as velocity and temperature of the drying air, thickness of the desired pellicle, concentration of the film-forming composition, etc., sufficient water has been removed to permit the pellicle being stripped from the casting surface. After stripping, the film is carried over suitable rolls to a conditioning chamber through which air is passed at a suitably elevated temperature to effect substantially complete removal of the water and to develop the moistureproof properties of the pellicles to the highest degree. The pellicle is led from the casting chamber over one or more cooling rolls, after which it may be wound on to a suitable core or mandrel, or optionally it may be cut off at predetermined intervals to produce a "cut-to-size" sheeted stock.

In practicing the above described method, the solids concentration (including plasticizers) of the casting composition, the distance of the doctoring edge of the hopper or the doctor knife, as the case may be, from the casting surface, the amount of composition metered to the hopper, and the speed of travel of the casting surface should all be so controlled that the pellicle will have the desired thickness which, in the case of a wrapping material, should be less than 0.005", and preferably less than 0.002".

In order to produce clear, transparent, non-tacky, flexible, moistureproof pellicles, it is essential that the pellicles be cast and dried at a temperature at least equivalent to the melting point of the wax, and, if the highest degree of moistureproofness is desired, the pellicle should at some time during the manufacture be submitted to a temperature higher than the melting point of the wax moistureproofing agent in the composition. Appropriate conditions can be obtained by having the casting surface at or above the crystallization point of the wax while the drying air is somewhat above or below this temperature although in no case should the temperature of the air be so low that the surface of the composition layer is chilled to a point below the crystallization point of the wax. Optionally, the casting surface may be somewhat below the crystallization point of the wax, provided the air temperature is above the wax crystallization point, but here again, the temperature of the casting surface must never be reduced so low as to induce crystallization of the wax from the composition.

The maintenance of these proper temperature conditions is important to successful operation of the invention. If the temperature of the thin layer of composition is permitted to fall very low before substantially all of the water has been removed, there is danger of wax crystallization. Even though mass crystallization of the wax is substantially avoided, there is still danger of wax crystallization on the surface of the layer, thereby inhibiting the evaporation of the remaining solvents, in which case continuous casting becomes impractical while the pellicle will frequently be blushed and/or hazy. As noted above, the atmosphere of the casting chamber is maintained at such a temperature as to heat the composition quickly as it exudes from the hopper or at least prevent any cooling effect before the layer passes into the drying chamber.

Substantially all the water must be removed from the pellicle before it is wound into a final roll. Most of the water solvent is, of course, removed in the drying chamber while the residual water is removed in the conditioning chamber. It is, in fact, preferable that a small amount of water remain in the pellicle when it is stripped from the casting surface so as to equalize to a certain extent the differences in characteristics of the opposite surfaces of the pellicle. It is at this point that the pellicle can be most conveniently submitted to a temperature equal to or higher than the melting point of the wax to develop moistureproofness to the highest degree.

After conditioning, the pellicle is cooled before being wound into rolls or otherwise collected. This is done to prevent wrinkling, shrinking, sticking of adjacent sheets, or the like. The cooling may be accomplished as above described by means of a cooling roll or the pellicle may be led through a chamber through which cold air is passed, or cold air blasts may be directed against the film by suitable jets or nozzles.

As will be readily understood by those skilled in the art, the polyvinyl alcohol, the blending agent, the plasticizer, and the wax constitute the "total solids" of a composition, even though one or more of them may be normally liquid.

Throughout the specification and claims, the term "moistureproof" is to be understood as falling within the following definition:

Moistureproof materials are defined as those which, in the form of continuous, unbroken sheets or films, permit the passage of not more than 690 grams of water vapor per 100 square meters per hour, over a period of 24 hours, at approximately $39.5°\pm0.5°$ C., the relative humidity of the atmosphere on one side of the film being maintained at least at 98% and the relative humidity of the atmosphere on the other side being maintained at such a value as to give a humidity differential of at least 95%.

For the purposes of experimental tests in the determination of moistureproofness as it applies to the product of the instant invention, a polyvinyl alcohol pellicle having a thickness of approximately 0.001" (not more than 0.005") is exposed at a temperature of $39.5°\pm0.5°$ C. (preferably $39.5°$ C. $\pm0.25°$ C.) so that one side is in contact with a humid atmosphere and the other side is in contact with a relatively arid atmosphere, the water vapor pressure differential being 50–55 mm. (preferably $53.4\pm0.7$ mm.) of mercury. For convenience, the number of grams of water vapor passing per 100 square meters per hour, over a period of 24 hours, under these conditions may be referred to as the "permeability value" of the pellicle. Obviously, the greater the degree of moistureproofness, the lower will be the permeability value. Ordinary pellicles of polyvinyl alcohol, which are useful as wrapping tissues, show a permeability value of the order of 6,500.

In wrapping cigars, cigarettes, and like articles which lose moisture by exposure to the atmosphere and in which it is desired to retain this moisture, the relatively moistureproof polyvinyl alcohol sheeting according to this preferred form of the invention is preferably applied in such a fashion that the side of the sheet which is next to the casting surface during casting becomes the exterior side of the wrapped package. The conditions should be reversed in wrapping materials which gain moisture by exposure to the atmosphere and in which it is desired to prevent such absorption.

The polyvinyl alcohol-amino polymer compositions may be employed, as briefly discussed above, in the preparation of film and thread. Film may be formed continuously as described above, or discontinuously, such as by casting on a plate. Likewise, the compositions may be converted by known methods into other shaped articles such as bristles, ribbons, tapes, cords preformed caps, sausage casings, etc. They can be utilized as adhesives to bond paper to paper, paper to glass such as tax stamps to glass, and even glass to glass, and are generally superior to unmodified polyvinyl alcohol as adhesives. They may also be used as coatings for all kinds of surfaces, including metal, glass, wood, fabric and non-fibrous film for photographic, wrapping or other purposes, such as regenerated cellulose, cellulose acetate, etc. Another valuable application of compositions of this invention is as a coating on surfaces of casting wheels or belts, in casting film-formers, such as cellulose acetate dissolved in organic solvents. Such a use is fully described and claimed in my copending application Serial No. 145,115, now Patent No. 2,198,621. For this purpose these compositions adhere more tenaciously to the metallic surface than unmodified polyvinyl alcohol and similarly permit the film being cast to be stripped without difficulty and without the development of a large amount of static. Since most of the amino polymers are much less sensitive to water than polyvinyl alcohol, films made from the modified polyvinyl alcohol compositions are as a rule more water resistant than unmodified polyvinyl alcohol. Another distinct advantage of the modified compositions is the improved affinity they exhibit towards various dyes such as acid dyestuffs.

The term "amino polymer" as used throughout the present specification and claims, unless otherwise modified, is intended to include amino polymers per se or in the form of their salts. The term "wax" is intended to include both true waxes and wax-like materials such as paraffin. The term "rosin," unless otherwise modified, is intended to include commercial rosin, rosinates, and modified rosin. The term "modified rosin" is defined as the rosin described and claimed in U. S. Letters Patent to Morton, No. 2,017,866.

While the invention has been described in terms of polyvinyl alcohol, a water soluble material, it is to be understood that it is also applicable to water insoluble polymerized vinyl resins, such as polyvinyl acetate, polyvinyl alcohol acetals, and others. Polyvinyl alcohol acetals, for example, are described in U. S. Patents Nos. 2,035,939 and 2,036,092. These materials, of course, must be dissolved in an appropriate solvent, such as concentrated aqueous acetic acid, acetone, etc., and the amino polymer must likewise be soluble in the same solvent.

Any variation of or modification of the invention as it has been described above in this application which conforms to the spirit of the invention is intended to be included within the scope of the claims.

I claim:

1. As a new composition of matter, a polymerized vinyl resin soluble in hot water and an amino polymer which is substantially insoluble in water and in 5% aqueous ammonia, but which is soluble in 2% aqueous acetic acid.

2. As a new composition of matter, polyvinyl alcohol and an amino polymer which is substantially insoluble in water and in 5% aqueous ammonia, but which is soluble in 2% aqueous acetic acid.

3. As a new composition of matter, polyvinyl alcohol and an amino polymer which is substantially insoluble in water and in 5% aqueous ammonia, but which is soluble in 2% aqueous acetic acid, said amino polymer being taken from the class consisting of carbohydrate amine polymers, resinous polymeric amino alcohol esters of acrylic acid and of its homologues substituted in the alpha position by a hydrocarbon radical, resinous reaction products of phenols, aldehydes and ammonia or a primary or secondary amine, resinous reaction products of polymeric methyl vinyl ketones with ammonia or a primary amine, resins obtained by hydrogenating ketone resins in the presence of ammonia or a primary or secondary amine, and amino derivatives of proteins.

4. As a new composition of matter, polyvinyl alcohol and diethylaminoethyl methacrylate polymer.

5. As a new composition of matter, polyvinyl alcohol and deacetylated chitin.

6. As a new composition of matter, polyvinyl alcohol and a resinous polymeric amino alcohol ester of methacrylic acid.

7. As a new composition of matter, polyvinyl alcohol and an amino derivative of a protein.

8. As a new composition of matter, polyvinyl alcohol and an amino derivative of zein.

9. As a new composition of matter, polyvinyl alcohol, an amino polymer which is substantially insoluble in water and in 5% aqueous ammonia, but which is soluble in 2% aqueous acetic acid and in toluene, a moistureproofing agent, and a plasticizer.

10. As a new composition of matter, polyvinyl alcohol, a resinous polymeric amino alcohol ester of methacrylic acid, a wax, and a plasticizer.

11. As a new composition of matter, polyvinyl alcohol, a resinous polymeric amino alcohol ester of methacrylic acid, rosin, a wax, and a plasticizer.

12. As a new composition of matter, polyvinyl alcohol, a resinous polymeric amino alcohol ester of methacrylic acid, modified rosin, a wax, and a plasticizer.

13. A transparent, self-sustaining film comprising polyvinyl alcohol and an amino polymer which is substantially insoluble in water and in 5% aqueous ammonia, but which is soluble in 2% aqueous acetic acid.

14. A transparent, self-sustaining film comprising polyvinyl alcohol and an amino polymer which is substantially insoluble in water and in 5% aqueous ammonia, but which is soluble in 2% aqueous acetic acid, said amino polymer being taken from the class consisting of carbohydrate amine polymers, resinous polymeric amino alcohol esters of acrylic acid and of its homologues substituted in the alpha position by a hydrocarbon radical, resinous reaction products of phenols, aldehydes and ammonia or a primary or secondary amine, resinous reaction products of polymeric methyl vinyl ketones with ammonia or a primary amine, resins obtained by hydrogenating ketone resins in the presence of ammonia or a primary or secondary amine, and amino derivatives of proteins.

15. A transparent, self-sustaining film comprising polyvinyl alcohol and diethylaminoethyl methacrylate polymer.

16. A transparent, self-sustaining film comprising polyvinyl alcohol and deacetylated chitin.

17. A transparent, self-sustaining film comprising polyvinyl alcohol and a resinous polymeric amino alcohol ester of methacrylic acid.

18. A transparent, self-sustaining film comprising polyvinyl alcohol, an amino polymer which is substantially insoluble in water and in 5% aqueous ammonia, but which is soluble in 2% aqueous acetic acid and in toluene, a moistureproofing agent, and a plasticizer.

19. A transparent, self-sustaining film comprising polyvinyl alcohol, a resinous polymeric amino alcohol ester of methacrylic acid soluble in 2% aqueous acetic acid and in toluene, a wax, and a plasticizer.

20. A transparent, self-sustaining film comprising polyvinyl alcohol, a resinous polymeric amino alcohol ester of methacrylic acid soluble in 2% aqueous acetic acid and in toluene, rosin, a wax, and a plasticizer.

21. A transparent, self-sustaining film comprising polyvinyl alcohol, a resinous polymeric amino alcohol ester of methacrylic acid soluble in 2% aqueous acetic acid and in toluene, modified rosin, a wax, and a plasticizer.

22. A transparent, self-sustaining film comprising 70%–90% hot water soluble polymerized vinyl resin, 10%–25% amino polymer which is substantially insoluble in water and in 5% aqueous ammonia, but which is soluble in 2% aqueous acetic acid, 4.5%–12% plasticizer, and 3%–4.5% moistureproofing agent.

23. A transparent, self-sustaining film comprising 70%–90% polyvinyl alcohol, 10%–25% amino polymer which is substantially insoluble in water and in 5% aqueous ammonia, but which is soluble in 2% aqueous acetic acid, 4.5%–12% plasticizer, and 3%–4.5% moistureproofing agent.

24. As a new composition of matter, 70%–90% polyvinyl alcohol, 10%–25% amino polymer which is substantially insoluble in water and in 5% aqueous ammonia, but which is soluble in 2% aqueous acetic acid, said amino polymer being taken from the class consisting of carbohydrate amine polymers, resinous polymeric amino alcohol esters of acrylic acid and of its homologues substituted in the alpha position by a hydrocarbon radical, resinous reaction products of phenols, aldehydes and ammonia or a primary or secondary amine, resinous reaction products of polymeric methyl vinyl ketones with ammonia or a primary amine, resins obtained by hydrogenating ketone resins in the presence of ammonia or a primary or secondary amine, amino derivatives of proteins, 4.5%–12% plasticizer, and 3%–4.5% moistureproofing agent.

25. A transparent, self-sustaining film comprising 70%–90% polyvinyl alcohol, 10%–25% amino polymer which is substantially insoluble in water and in 5% aqueous ammonia, but which is soluble in 2% aqueous acetic acid, said amino polymer being taken from the class consisting of carbohydrate amine polymers, resinous polymeric amino alcohol esters of acrylic acid and of its homologues substituted in the alpha position by a hydrocarbon radical, resinous reaction products of phenols, aldehydes and ammonia or a primary or secondary amine, resinous reaction products of polymeric methyl vinyl ketones with ammonia or a primary amine, resins obtained by hydrogenating ketone resins in the presence of ammonia or a primary or secondary amino derivatives of proteins, 4.5%–12% plasticizer, and 3%–4.5% moistureproofing agent.

EMMETTE F. IZARD.